United States Patent [19]

Ames

[11] 4,376,855
[45] Mar. 15, 1983

[54] EMULSIFIABLE ETHYLENE CONTAINING POLYOLEFIN WAXES HAVING IMPROVED EMULSIFIABILITY AND PROCESS FOR THEIR PREPARATION

[75] Inventor: William A. Ames, Longview, Tex.

[73] Assignee: Eastman Kodak Company, Rochester, N.Y.

[21] Appl. No.: 276,273

[22] Filed: Jun. 22, 1981

[51] Int. Cl.³ .................... C08F 10/02; C08F 255/02; C08F 255/04
[52] U.S. Cl. .................................. 528/271; 525/285; 525/301; 525/386
[58] Field of Search .................. 260/285 A; 525/285, 525/301, 386; 528/271

[56] References Cited

U.S. PATENT DOCUMENTS 3,480,580  11/1969  Joyner et al. ...................... 525/386
3,859,386   1/1975  Mainord ............................. 525/301
4,028,436   6/1977  Bogan et al. ....................... 525/285

*Primary Examiner*—Carman J. Seccuro
*Attorney, Agent, or Firm*—Clyde L. Tootle; Daniel B. Reece, III

[57] ABSTRACT

Emulsifiable ethylene containing low viscosity polyolefin waxes having improved properties are provided by reacting low viscosity ethylene containing polyolefin waxes having less than 0.1 percent unsaturation with an unsaturated polycarboxylic component and an amount of peroxide added incrementally during the reaction wherein the weight ratio of unsaturated polycarboxylic component to peroxide is about 1/1 to less than about 5/1.

20 Claims, No Drawings

EMULSIFIABLE ETHYLENE CONTAINING POLYOLEFIN WAXES HAVING IMPROVED EMULSIFIABILITY AND PROCESS FOR THEIR PREPARATION

This invention relates to modified or grafted low viscosity polyethylene and ethylene/alpha-olefin copolymer waxes having improved physical properties, and the process for preparation thereof. The process of this invention includes both a melt phase and solution processes for preparing modified or grafted low viscosity polyolefin waxes. The process comprises reacting the low viscosity polyethylene or ethylene/-alpha-olefin copolymer waxes with an unsaturated polycarboxylic compound in the presence of an excess amount of a peroxide added incrementally during the reaction.

It is known in the art to react poly-α-olefin compounds with polycarboxylic compounds to prepare modified or grafted polyolefin compositions. However, the teachings of the prior art, particularly when directed to reacting polyethylene waxes with polycarboxylic acids or anhydride carry out the reaction in the absence of a free radical initiator or catalyst, such as a peroxide. Heretofore, it was known in the art that to react polyethylene with unsaturated polycarboxylic acids in the presence of peroxides and oxygen provided only insoluble crosslinked unemulsifiable material. Therefore, it was believed necessary to carry out the reaction of low viscosity polyethylenes with unsaturated polycarboxylic acids in a solvent or in the complete absence of oxygen at elevated temperatures if peroxide initiators were used.

Moreover, it is known in the art that one of the most accepted procedures for determination of emulsion quality is to prepare the emulsion, determine the percent solids, and dilute a portion of the emulsion to 1 percent solids by addition of distilled water. The light transmittance of the 1 percent solids solution is determined using a visible spectrophotometer at 525 mμ. The higher the value for the percent transmittance, the smaller the average particle size of the emulsion and the better its quality. In many applications, a small particle size is desirable because a film of better quality is deposited onto the floor or other substrate when the emulsion is applied to the surface to be coated. Generally, emulsions should have transmittance values of at least 25 percent to be acceptable with higher values being more suitable for many applications. Frequently, an opaque emulsion will appear to be satisfactory upon examination with the naked eye immediately after it has been prepared. But, if the light transmittance is determined and found to be much below 25 percent, upon prolonged standing the solids in the emulsion will either "cream", that is, float to the top, or settle. This is probably related to the density and average size of the suspended particles. In either case, the emulsion would not exhibit good long-term stability characteristics and would not meet with customer approval. It was generally assumed that one of the best ways to improve emulsion stability was to increase the acid number of the wax. Although this approach has been satisfactory on some occasions, it is recognized that higher acid numbers do not always assure good emulsion quality. Also, in the case of grafting, increasing the acid number results in additional cost.

It would therefore be an advance in the state of the art to provide processes for preparing low viscosity modified polyethylene or ethylene/alphaolefin waxes by reacting the unmodified polyethylene or ethylene/alpha-olefin wax with a polycarboxylic acid using a free radical initiator under conditions where extreme measures to rigorously exclude oxygen or air are unnecessary and provide emulsifiable waxes forming emulsions having improved quality.

In accordance with this invention, it has been found that low viscosity polyethylene and ethylene alpha-olefin copolymers containing at least one alpha-olefin monomer having 3 to 12 carbon atoms can be modified to produce emulsifiable waxes having improved physical and chemical properties. These modified waxes are prepared by reacting such low viscosity waxes having less than 0.1 percent unsaturation with organic unsaturated polycarboxyl anhydrides and acid esters derived therefrom and an excess amount of peroxide added incrementally during the reaction. These emulsifiable low viscosity polyethylene waxes have a saponification number of from about 60 to about 250, preferably about 100 to 160.

The unmodified low viscosity polyethylene and ethylene/alpha-olefins copolymers containing at least one alpha-olefin monomer having from 3 to 12 carbon atoms include, for example, high, medium and low density polyethylene and copolymers of ethylene and propylene, butene-1, 4-methyl-1-pentene, 3-methyl-1-butene, 4,4-dimethyl-1-pentene, 3-methylpentene-1, 4-methylhexene-1, 5-ethylhexene-1, 6-methylheptene-1, hexene-1, heptene-1, octene-1, nonene-1, decene-1, dodecene-1 and the like. Such copolymers contain from 99 to 50 percent by weight ethylene, preferably 99 to 70 percent, such as a 95 ethylene/5 propylene copolymer, 98 ethylene/2-butene-1 copolymer and the like. Such homopolymers or copolymers can be either crystalline or amorphous, although the crystalline modified polyethylenes and ethylene/alpha olefin waxes are generally more useful in floor polish applications.

The unmodified polyethylene or ethylene/-alpha-olefin waxes can be prepared by direct synthesis. Such suitable low viscosity waxes prepared directly have a melt viscosity of 5 to 5,000 cp. at 150° C., preferably 15 to 3,000, most preferred 25 to 1,500.

The low viscosity polyethylene waxes are reacted with unsaturated polycarboxylic acids, anhydrides or esters thereof at temperatures from about 180° C. to 230° C., and in the presence of an excess amount of free radical sources. The grafting is carried out by adding the acid or anhydride and the peroxide incrementally. The weight ratio of acid or anhydride to peroxide is critical and is about 1/1 to less than about 5/1, preferably 1/1.5 to 3.5/1, most preferred 3.3/1. More than a ratio of 5/1 lowers the transmittance value of the emulsions and ratios of 1/1 employ more peroxides than needed for reaction.

Suitable free radical sources are, for example, peroxides having decomposition rates such that the half life of the catalyst is equal to or greater than 0.1 second at the reaction temperature. Such preferred peroxides are ditertiary butyl peroxide and 2,5-dimethyl-2,5-di(tertbutyl peroxy)hexane. However, peroxides such as tertiary butyl hydroperoxide and cumene hydroperoxide can be used. The reaction may be carried out either in a batchwise or in a continuous manner with contact times in the order of about 10 minutes to about 2 hours depending on the saponification number of the product desired.

Suitable unsaturated polycarboxylic acids and anhydrides are, for example, maleic acid, maleic anhydride, fumaric acid, citraconic anhydride, aconitic anhydride and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. Preferably, about 0.5 to 25% unsaturated polycarboxylic acid, anhydride or esters thereof, based on the weight of the low viscosity polyolefin, can be used in the invention. The most preferred emulsifiable modified low molecular weight polyethylene waxes have a melt viscosity of 5 to 6000 centipoise at 150° C. and a saponification number of about 60 to about 250, most preferably about 100 to 160, and a Gardner color of 7 or less.

It is necessary that the maleic anhydride and the peroxide together be added in separate and distinct increments. If all the maleic anhydride is added initially and the peroxide is added dropwise during the reaction the modified wax is not emulsifiable. If all the peroxide is added initially and the maleic anhydride is added incrementally, there would be the danger of an explosion due to the decomposition of peroxides and the modified wax would not be emulsifiable due to the lack of free radicals present when the maleic anhydride is subsequently added. In adding the reactants in increments it is necessary that the increments added be small enough to keep the reaction under control. If desired, the reactants can be continuously added in very minute amounts over an extended period of time.

One method for the determination of saponification number of maleated polyethylene is as follows: Weigh approximately 1 g. of the sample into a 500 ml. alkali-resistant Erlenmeyer flask and add 100 ml. distilled xylene and 50 ml. of n-butanol. Heat under a reflux condenser for 1 hour. Cool the solution to 75° C. or less, and add from a buret 10 ml. standardized 0.50 N KOH in ethyl alcohol. Heat under reflux for 45 min. Cool, and add from a buret standardized 0.10 N CH$_3$COOH in xylene until the mixture is acid to phenolphthalein. Add at least 1 ml. excess CH$_3$COOH. Reheat the solution under reflux for 15 min. Remove from heat, add 5 ml. water, and titrate to a faint pink end point with 0.10 N KOH in ethyl alcohol. Run a blank in this manner using the same amounts of reagents and the same heating times.

Calculation:

$$\frac{[(\text{ml KOH} \times N) - (\text{ml CH}_3\text{COOH} \times N)]_{\text{(for sample)}} - [(\text{ml KOH} \times N) - (\text{ml CH}_3\text{COOH} \times N)]_{\text{(for blank)}} \times 56.1}{\text{g Sample}} = \text{Sap. No.}$$

The unreacted, unsaturated polycarboxylic acid can be separated from the reaction mixture by purging the reaction mixture with an inert gas while the melt temperature is between 200° and 300° C. After the unreacted unsaturated polycarboxylic acid has been removed, the modified poly-α-olefin can be further purified by vacuum stripping, solvent extraction, or dissolving in a suitable solvent and isolated by removing the solvent.

It has been found in the present invention that not only the acid number, which is directly related to the amount of maleic anhydride incorporated, but also the amount of peroxide used to prepare the grafted wax has a significant effect on the quality of the emulsion produced. The unobvious feature can best be illustrated by the effect of peroxide concentration on percent transmittance of the emulsions. When 250 parts of ethylene-propylene copolymer wax containing 2.6 percent polymerized propylene was treated at approximately 5-minute intervals with 10 increments of 2 grams maleic anhydride each containing 0.2 gram of di-tertiarybutyl peroxide, a wax having a saponification number of 70.4 was obtained. A nonionic emulsion of the wax had a transmittance value of only 18 percent. When the same wax was treated in the same manner except using 0.8 gram of peroxide in each of the 10 increments of maleic anhydride, a wax having a saponification number of 72.2 was obtained. Thus, the saponification numbers of the two grafted waxes are essentially the same. However, the surprising feature which was totally unexpected was observed when a nonionic emulsion was prepared from the wax having a saponification number of 72.2. Using the same recipe as that used for the emulsion having a transmittance of 18, the emulsion had an emulsion transmittance of 57 percent.

Further work using the same amounts of wax and maleic anhydride with different amounts of peroxide revealed that although the saponification numbers were quite similar that the more peroxide used, the greater the transmittance values of the emulsions. Moreover, the percent transmittance varies approximately in a linear manner with the amount of peroxide used. Thus, emulsion quality is a function of peroxide concentration and is directly proportional to the amount of peroxide used.

The reason for improved emulsifiability using larger amounts of peroxide is not completely understood. A possible explanation, although this by no means is proposed as theory, is that somehow the maleic anhydride is grafted to the wax in a more favorable or more random fashion at the higher peroxide levels. This would tend to result in a slight reduction in crystallinity and hence softening point and density as is shown in Table I.

This invention can be further illustrated by the following examples of preferred embodiments thereof, although it will be understood that these examples are included merely for purposes of illustration arnd are not intended to limit the scope of the invention unless otherwise specifically indicated.

EXAMPLE 1

A 1-liter, 4-neck flask charged with 250 grams of ethylene-propylene copolymer wax containing 2.6 percent polymerized propylene having a viscosity of 275 cp at 150° C. was fitted with a thermowell, stirrer, condenser, and N$_2$ bubbler system. The flask was thoroughly purged with N$_2$ to remove air. The wax was heated until molten and then stirred with heating under a N$_2$ atmosphere to 220°–230° C. At this temperature, at approximately 5-minute intervals, 2-gram increments of powdered maleic anhydride each treated with 0.2 gram of di-tertiary-butyl peroxide were added until a total of 20 grams of maleic anhydride and 2 grams of peroxide were charged to the flask. The reaction was allowed to proceed for 30 minutes after the final increment was added. At this point, unreacted maleic anhydride was removed by stripping the molten wax with a strong N₂ purge for 2 hours.

The resulting grafted composition had a melt viscosity determined by the Thermosel method at 150° C. of 1,450 cp, a ring and ball softening point of 115° C., and a density of 0.951 gram per cubic centimeter. The saponification number was 70.4.

A nonionic pressure emulsion of the wax was prepared by charging 40 grams of the wax, 12 grams of Igepal CO-530 emulsifier, 200 ml of distilled water, and 110 percent of the theoretical amount of KOH required to neutralize all of the acid functionality of the wax to a 300-ml Parr autoclave. The autoclave was heated to 135° C. and held at this temperature with stirring for 30 minutes. The emulsion was cooled to 50° C. with continued stirring by passing cold water through the cooling coils. The emulsion was fluid, opaque, and appeared to be of good quality. A portion of the emulsion was diluted to 1 percent solids. The percent transmittance was determined on a Bausch and Lomb Spectronic 20 visible spectrophotometer at 525 mµ. The transmittance value was 18 percent. This is below the acceptable value for what is generally considered to be a good quality emulsion.

EXAMPLES 2-5

In these examples, the same wax in the same quantities and the same amount of maleic anhydride were used as in Example 1. Only the peroxide concentration was varied. The results are summarized in Table I.

Table I shows that by using a constant charge of wax and maleic anhydride that the percent transmittance of the resulting emulsions can be increased by increasing the peroxide concentration used in grafting. The percent transmittance changes in essentially a linear manner with increasing peroxide concentration.

TABLE I

Effect of Peroxide Concentration on Properties of Grafted Ethylene-Propylene Copolymer Waxes

| Example | 2 | 3 | 4 | 5 | 6 |
|---|---|---|---|---|---|
| Reactor Charge: | | | | | |
| Parts of Wax | 250 | 250 | 250 | 250 | 250 |
| Parts Maleic Anhydride | 20 | 20 | 20 | 20 | 20 |
| Parts Di-Tertiary-Butyl Peroxide | 2 | 4 | 6 | 8 | 8 |
| Increments Added: | 10 | 10 | 10 | 10 | 10 |
| Maleic Anhydride, g/increment | 2 | 2 | 2 | 2 | 2 |
| Di-Tertiary-Butyl Peroxide, g/increment | 0.2 | 0.4 | 0.6 | 0.8 | 0.8 |
| Properties | | | | | |
| Thermosel Melt Viscosity at 150° C., cp | 1,450 | 1,025 | 875 | 1,025 | 1,075 |
| Saponification Number | 70.4 | 71.4 | 75.8 | 72.2 | 80 |
| Penetration Hardness, 0.1 mm | 2.2 | 1.6 | 1.9 | 1.2 | 1.4 |
| Density, g/cc | 0.951 | 0.951 | 0.950 | 0.948 | 0.949 |
| Ring and Ball Softening Point, °C. | 115 | 113 | 111 | 111 | 111 |
| Emulsion Transmittance, % | 18 | 25 | 53 | 57 | 63 |
| Gardner Color | 5-6 | 6 | 7 | 5 | 6 |

It was completely unexpected that a process as disclosed in the present application provides emulsifiable low molecular weight polymeric materials having improved emulsifiability and that an increased amount of peroxide added incrementally during the reaction provides this result since peroxides generally cross-link polyethylene waxes.

The modified low molecular weight poly-α-olefin compositions of this invention are useful for many purposes including preparing nonionic and anionic emulsions which are excellent textile-treating agents which improve the scuff resistance of fabrics such as permanently creased cotton fabrics. The emulsions are also useful in floor polish compositions providing scuff resistant, hard, glossy finishes and also as sizing for glass fibers and coatings for citrus fruits.

The invention has been described in detail with particular reference to preferred embodiments thereof, but it will be understood that variations and modifications can be effected within the spirit and scope of the invention.

I claim:

1. A process for preparing an emulsifiable ethylene containing low viscosity polyolefin wax having a saponification number of from about 30 to about 250 which comprises reacting low viscosity polyolefin waxes selected from the group consisting of polyethylene or ethylene/alpha-olefin copolymers containing from 99 to 50 percent by weight ethylene and at least one alpha-olefin monomer having from 3 to 12 carbon atoms and having a melt viscosity of about 5 to 6,000 cp. at 150° C. and having less than 0.1 percent unsaturation under a substantially inert atmosphere with an unsaturated polycarboxylic component and an amount of peroxide added incrementally during the reaction wherein the weight ratio of unsaturated polycarboxylic component to peroxide is about 1/1 to less than 5/1.

2. A process for preparing an emulsifiable ethylene containing low viscosity wax according to claim 1 wherein said wax is low density polyethylene wax.

3. A process for preparing an emulsifiable ethylene containing low viscosity wax according to claim 2 wherein said unsaturated polycarboxylic component is maleic anhydride.

4. A process for preparing an emulsifiable ethylene containing low viscosity wax according to claim 3 wherein said peroxide is di-tertiary butyl peroxide.

5. A process for preparing an emulsifiable ethylene containing low viscosity polyolefin wax having a saponification number of from about 100 to about 140 which comprises reacting low viscosity polyolefin waxes selected from the group consisting of polyethylene or ethylene/alpha-olefin copolymers containing from 99 to 50 percent by weight ethylene and at least one alpha-olefin monomer having from 3 to 12 carbon atoms and having a melt viscosity of about 5 to 6,000 cp. at 150° C. and having less than 0.1 percent unsaturation under a substantially inert atmosphere with an unsaturated polycarboxylic component and an amount of peroxide added incrementally during the reaction wherein the weight ratio of unsaturated polycarboxylic component to peroxide is about 1/1 to less than 5/1.

6. A process for preparing an emulsifiable ethylene containing low viscosity wax according to claim 5 wherein said wax is low density polyethylene wax.

7. A process for preparing an emulsifiable ethylene containing low viscosity wax according to claim 6 wherein said unsaturated polycarboxylic component is maleic anhydride.

8. A process for preparing an emulsifiable ethylene containing low viscosity wax according to claim 7 wherein said peroxide is di-tertiary butyl peroxide.

9. A process for preparing an emulsifiable ethylene containing low viscosity polyolefin wax having a saponification number of from about 100 to about 140 which comprises reacting low viscosity polyolefin waxes selected from the group consisting of polyethylene or ethylene/alpha-olefin copolymers containing from 99 to 50 percent by weight ethylene and at least one alpha-olefin monomer having from 3 to 12 carbon atoms and having a melt viscosity of about 15 to 3,000 cp. at 150° C. and having less than 0.1 percent unsaturation under a substantially inert atmosphere with an unsaturated polycarboxylic component and an amount of peroxide added incrementally during the reaction wherein the weight ratio of unsaturated polycarboxylic component to peroxide is about 1/1 to less than 5/1.

10. A process for preparing an emulsifiable ethylene containing low viscosity wax according to claim 9 wherein said wax is low density polyethylene wax.

11. A process for preparing an emulsifiable ethylene containing low viscosity wax according to claim 10 wherein said unsaturated polycarboxylic component is maleic anhydride.

12. A process for preparing an emulsifiable ethylene containing low viscosity wax according to claim 11 wherein said peroxide is di-tertiary butyl peroxide.

13. A process for preparing an emulsifiable ethylene containing low viscosity polyolefin wax having a saponification number of from about 100 to about 140 which comprises reacting low viscosity polyolefin waxes selected from the group consisting of polyethylene or ethylene/alpha-olefin copolymers containing from 99 to 50 percent by weight ethylene and at least one alpha-olefin monomer having from 3 to 12 carbon atoms and having a melt viscosity of about 25 to 1,500 cp. at 150° C. and having less than 0.1 percent unsaturation under a substantially inert atmosphere with an unsaturated polycarboxylic component and an amount of peroxide added incrementally during the reaction wherein the weight ratio of unsaturated polycarboxylic component to peroxide is about 1/1 to less than 5/1.

14. A process for preparing an emulsifiable ethylene containing low viscosity wax according to claim 13 wherein said wax is low density polyethylene wax.

15. A process for preparing an emulsifiable ethylene containing low viscosity wax according to claim 14 wherein said unsaturated polycarboxylic component is maleic anhydride.

16. A process for preparing an emulsifiable ethylene containing low viscosity wax according to claim 15 wherein said peroxide is di-tertiary butyl peroxide.

17. A process for preparing an emulsifiable ethylene containing low viscosity polyolefin wax having a saponification number of from about 100 to about 140 which comprises reacting low viscosity polyolefin waxes selected from the group consisting of polyethylene or ethylene/alpha-olefin copolymers containing from 99 to 50 percent by weight ethylene and at least one alpha-olefin monomer having from 3 to 12 carbon atoms and having a melt viscosity of about 25 to 1,500 cp. at 150° C. and having less than 0.1 percent unsaturation under a substantially inert atmosphere with an unsaturated polycarboxylic component and an amount of peroxide added incrementally during the reaction wherein the weight ratio of unsaturated polycarboxylic component to peroxide is about 3.3/1.

18. A process for preparing an emulsifiable ethylene containing low viscosity wax according to claim 17 wherein said wax is low density polyethylene wax.

19. A process for preparing an emulsifiable ethylene containing low viscosity wax according to claim 18 wherein said unsaturated polycarboxylic component is maleic anhydride.

20. A process for preparing an emulsifiable ethylene containing low viscosity wax according to claim 19 wherein said peroxide is di-tertiary butyl peroxide.

* * * * *